May 12, 1953  E. W. TENBRINK  2,638,002
TRACTOR ENGINE STARTING APPARATUS
Filed June 21, 1952
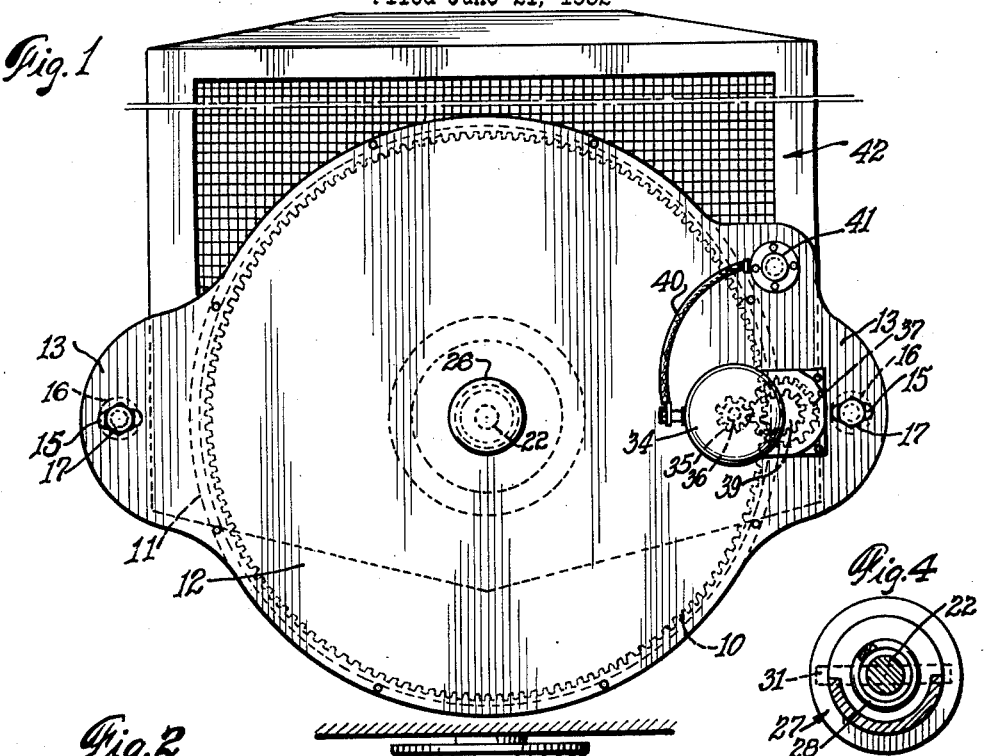
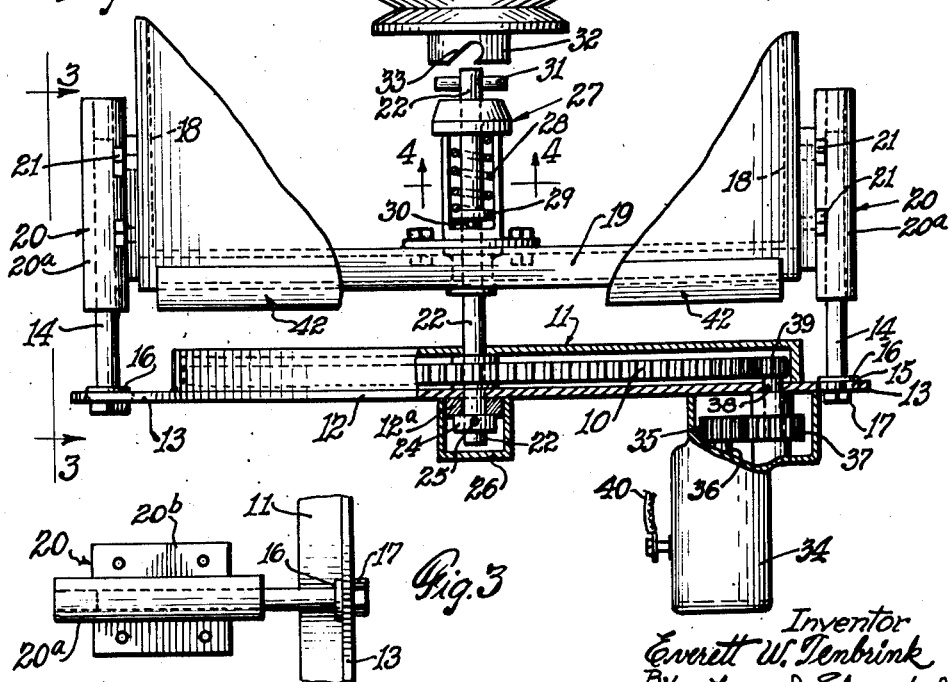
Inventor
Everett W. Tenbrink
By Frank Schraeder Jr.
Attorney Patented May 12, 1953

2,638,002

UNITED STATES PATENT OFFICE 2,638,002

TRACTOR ENGINE STARTING APPARATUS

Everett W. Tenbrink, Dodge City, Kans.

Application June 21, 1952, Serial No. 294,853

9 Claims. (Cl. 74—6)

Although modern tractors are provided with electric starters, there are still in use many tractors the engines of which must be cranked by hand to start them.

The present invention has for its object to produce a simple and novel electrical engine starting apparatus that may easily be mounted on tractors which lack automatic starters, thereby modernizing these tractors.

The various features of novelty whereby the present invention is characterized will hereinafter be pointed out with particularity in the claims, but, for a full understanding of the invention and of its objects and advantages, reference may be had to the following detailed description taken in connection with the accompanying drawing, wherein:

Figure 1 is a front view of a tractor on which one of my starting units is mounted, only a small fragment of the tractor being shown.

Fig. 2 is a top plan view, with parts broken away, of the front end of the tractor and starter unit.

Fig. 3 is a view looking from line 3, in Fig. 2, in the direction of the arrows, only the supporting sleeve or bracket and a small fragment of the starting unit, proper, being shown.

Fig. 4 is a section, on a larger scale, along line 4—4 of Fig. 2 showing only the engine starting shaft and its immediate support on the tractor frame.

Referring to the drawing, 10 is a fairly thin gear wheel the diameter of which is only a little less than the width of the front end of a tractor frame. This gear is enclosed in a cylindrical casing 11, the diameter and axial length of which are only slightly greater than the corresponding dimensions of gear wheel 10. One end wall 12 of the casing is extended in diametrically opposed directions, creating ears 13, 13. This wall constitutes the base plate or supporting plate of the starter unit structure.

Fastened to plate 12 are two rods 14, 14 that project at right angles to the plate on the same side as that on which the body portion of the casing is located. In the arrangement shown, each rod extends through a slot 15 in one of the ears 13, 13; each rod being provided with a shoulder 16 that engages with the inner or rear face of the plate, while a nut 17 is screwed on the rod on the front side of the plate to clamp the plate between the nut and the shoulder. The slots are on a diameter, extended, of the body of the casing, so that the distance between the rods may be varied.

The rods serve to support the casing on the front end of a tractor. Therefore I secure to the side members 18, 18 of a tractor frame, which also has a transverse front member 19 connected to the side members, a pair of brackets 20, 20. Each bracket consists of a long sleeve 20$^a$ and wings 20$^b$ which may conveniently be a flat plate tangent and welded to the sleeve. These brackets are secured to the frame by screws or bolts 21, with the axes of the sleeves parallel to that of the crankshaft of the tractor engine, and, in the same plane with the latter. The rods are a sliding fit within the sleeves.

Gear wheel 10 is fixed to an engine starting shaft 22 which extends through both end walls of the cylindrical casing. Plate 12 has a hub 12$^a$ through which the front end of the shaft passes and beyond which it projects a short distance. On this projecting portion of the shaft is a collar 24 held in place by a pin 25. A cup-shaped cap 26 fits and is frictionally held on hub 12$^a$ to conceal the shaft end.

Shaft 22 extends rearwardly past frame member 19 and through a small housing 27 fixed to the rear or inner side of this frame member. The housing is open at the top and is closed at its inner or rear end.

Within this housing, and surrounding the shaft, is a coiled compression spring 28. One end of this spring bears against the rear, closed end of the housing, while the other end engages a shoulder on the shaft; the shoulder illustrated comprising a collar 29 loose on the shaft and a pin 30 extending diametrically through the shaft in front of the collar. The spring is under sufficient initial compression to enable it to hold pin 30 against a cooperating, stationary part of the housing which, for this purpose, may be said to form a part of frame member 19.

On the rear end of shaft 22 is a cross pin 31 that is adapted to stand clear of the front end of the tractor engine crank shaft 32, except during a starting operation, and to enter the conventional biased notch 33 in the end of the crank shaft when the casing is pushed backwardly or inwardly. Pin 31 and notch 33 constitutes a self-releasing clutch of a conventional type.

On the flat, front side of plate 12 is an electric motor 34 the casing of which is shaped to house a pinion 35 on motor shaft 36, as well as a larger gear wheel 37. Element 37 is fixed to a short shaft 38 that extends through plate 12 a short distance from the periphery of large gear wheel 10. On the inner or rear end of shaft 38 is a pinion 39 which meshes with gear wheel 10. The pinion 39 and the corresponding end of shaft 38 are enclosed in a lateral bulge or extension of casing 11.

Motor 34 is energized by battery current through a circuit, of which only a short cable section 40 is shown, containing a switch 41 of the push button type. This switch is mounted on base plate 12, above the motor.

With the starter unit mounted on a tractor and with the parts in their idle positions, as shown, the truck engine may be started by operating the push button with the right hand and pressing the unit back with the left hand bearing on the front or outer face of base plate 12. This clutches the engine starting shaft to the crank shaft of the tractor engine and also causes the motor to drive the first of these shafts which, in turn, drives the crank shaft. As soon as the tractor engine reaches a predetermined speed, notch 33 in the crank shaft kicks out pin 31, thereby unclutching the starter shaft from the crank shaft. When the operator feels this kick he releases the push button and withdraws his left hand so that the starter unit as a whole is held in its idle position until its use is again required.

It will thus be seen that I have produced a starter unit for a tractor that may be mounted on the front thereof, directly ahead of the radiator 42, without making any alterations in tractor structure except holes to receive fastenings for the bearing sleeves 20, 29 and house 27. The slots in the base plate permit attachment of the unit to frames varying in width. A fairly light spring will hold the unit in its retracted position and, since the only resistance to moving the unit into clutching relation to the crank shaft is that offered by the spring, very little effort is required to cause the unit to start an engine. It will also be seen that all of the parts are simple and rugged and will need little attention after being installed.

While I have illustrated and described with particularity only a single preferred form of my invention, I do not desire to be limited to the exact details thus illustrated and described, but intend to cover all forms and arrangements that come within the definitions of my invention constituting the appended claims.

I claim:

1. The combination with a vehicle frame having side members and a transverse front member, of a power operated starter unit extending across the front of the frame, means connecting said unit to said side members for sliding movements lengthwise of the latter, a bearing device fixed to the middle of said front member, said unit having an engine starting shaft extending slidably and rotatably through said bearing device, cooperating stop elements on said shaft and said bearing device to limit the outward movement of the shaft, and a spring acting on said shaft yieldingly to hold it in its outermost position.

2. A combination as set forth in claim 1, wherein the connecting means between the starter unit comprises a pair of sleeves fixed to the frame side members parallel to the longitudinal axis of the frame, together with rods fixed to the starter unit and fitted slidably into the sleeves.

3. A combination as set forth in claim 1, wherein the connection between the frame and the starter unit comprises bearings fixed to the frame and rods rigidly fastened to the starter unit and fitted slidably into said bearings.

4. A combination as set forth in claim 1, wherein the connection between the frame and the starter unit comprises bearings fixed to the frame and rods rigidly fastened to the starter unit and fitted slidably into said bearings, wherein the said unit includes a vertical supporting plate that spans the width of the frame and has near the ends slots elongated in the transverse direction, and wherein the rods extend through said slots and are provided with means to clamp them to the plate in any desired positions along the slots.

5. The combination with a vehicle frame having side members and a transverse front member, of a power operated starter unit extending across the front of the frame, means connecting said unit to said side members for sliding movements lengthwise of the latter, a bearing device fixed to the middle of said front member, said unit having midway between its ends an engine starting shaft extending slidably and rotatably through said bearing device, cooperating stop elements on said shaft and said bearing device to limit the outward movement of the shaft, and a spring located within said bearing device and acting on said shaft yieldingly to hold it in its outermost position.

6. A combination as set forth in claim 5, wherein the bearing device is a housing open at the top and closed at the end through which the free end of the shaft protrudes, the shaft is provided with a shoulder at a point within the casing, and the spring is a compression spring, arranged between said shoulder and said closed end of the casing, and under sufficient initial compression to press said shoulder against the opposite end of the casing.

7. The combination with a vehicle frame having side members and a transverse front member, of a power operated starter unit provided with a protruding, rotatable engine starting shaft and extending across the front of the frame, means connecting said unit to said side members for sliding movements lengthwise of the latter, a bearing device fixed to the middle of said front member, said unit having the engine starting shaft thereof extending slidably and rotatably through said bearing device, cooperating stop elements on said shaft and said bearing device to limit the outward movement of the shaft, and a spring acting on said shaft yieldingly to hold it in its outermost position while permitting the entire unit to be pushed inwardly to establish a conventional driving connection with the crank shaft of an engine on the frame.

8. A starter unit for an engine comprising a shallow cylindrical housing having a diameter somewhat less than the width of the vehicle frame to which the unit is to be attached, one end wall being a plate that protrudes at diametrically opposed points to increase the width of the plate to at least that of the said frame, a gear wheel disposed in and substantially filling the casing, a starter shaft to which said gear is fixed extending through the center of the casing, an electric motor mounted on said plate on the face opposite that on which the body of the casing lies, a gear train connecting the motor and said gear wheel, a control switch for the motor on said plate, rods projecting at right angles to the plate from the same side as the body of the casing, parallel to the starter shaft, and brackets for attachment to a vehicle frame and having long sleeves in which said rods are a sliding fit.

9. A unit as set forth in claim 8, wherein the plate has slots located on a diameter of the casing, and wherein the rods extend through said slots and are provided with means to secure them to the plate in any positions along said slots.

EVERETT W. TENBRINK.

No references cited.